United States Patent
Mitsuo et al.

(10) Patent No.: US 7,832,760 B2
(45) Date of Patent: Nov. 16, 2010

(54) HEAD PROTECTING AIRBAG SYSTEM

(75) Inventors: Tetsu Mitsuo, Nissin (JP); Akihiko Narui, Yokohama (JP); Mitsuo Nogami, Yokohama (JP)

(73) Assignees: Toyota Jidosha Kabushiki Kaisha, Toyota (JP); Autoliv Development AB, Vargarda (SE)

( * ) Notice: Subject to any disclaimer, the term of this patent is extended or adjusted under 35 U.S.C. 154(b) by 486 days.

(21) Appl. No.: 11/892,894

(22) Filed: Aug. 28, 2007

(65) Prior Publication Data
US 2008/0054606 A1 Mar. 6, 2008

(30) Foreign Application Priority Data
Aug. 31, 2006 (JP) ............... 2006-236020

(51) Int. Cl.
*B60R 21/16* (2006.01)
(52) U.S. Cl. .................. 280/730.2; 280/729; 280/749
(58) Field of Classification Search ............. 280/730.2, 280/749, 743.1, 729
See application file for complete search history.

(56) References Cited

U.S. PATENT DOCUMENTS

| | | | |
|---|---|---|---|
| 6,371,512 B1 | 4/2002 | Asano et al. | |
| 6,758,490 B2 | 7/2004 | Hoeft et al. | |
| 7,469,922 B2 * | 12/2008 | Kino et al. | 280/729 |
| 7,549,669 B2 * | 6/2009 | Keshavaraj | 280/729 |
| 7,618,057 B2 * | 11/2009 | Pinsenschaum et al. | 280/730.2 |
| 2005/0006882 A1 * | 1/2005 | Wang | 280/730.2 |

FOREIGN PATENT DOCUMENTS

| | | |
|---|---|---|
| JP | B2 3520836 | 11/2001 |
| JP | A 2002-321583 | 11/2002 |
| JP | B2 3656156 | 1/2003 |
| JP | A-2003-237521 | 8/2003 |
| JP | A 2004-058848 | 2/2004 |
| JP | A-2004-291857 | 10/2004 |
| JP | A 2005-029035 | 2/2005 |
| JP | A-2005-096575 | 4/2005 |

* cited by examiner

*Primary Examiner*—Eric Culbreth
(74) *Attorney, Agent, or Firm*—Oliff & Berridge, PLC

(57) ABSTRACT

A vertical cell is formed in a forward inflation section of an airbag. The vertical cell extends in a vehicle height direction at the rear of a pillar, and communicates through a bottom end of the vertical cell with a horizontal cell. When the inflation section is deployed, the folded horizontal cell or the lower side part of the airbag is pulled back toward the passenger compartment with respect to the side window opening. Accordingly, the horizontal cell deploys to an area below a bottom edge of the side window opening or a beltline in the passenger compartment on the inner side of a front side door.

20 Claims, 5 Drawing Sheets

HEAD PROTECTING AIRBAG SYSTEM

INCORPORATION BY REFERENCE

The disclosure of Japanese Patent Application No. 2006-236020 filed on Aug. 31, 2006 including the specification, drawings and abstract is incorporated herein by reference in its entirety.

BACKGROUND OF THE INVENTION

1. Field of the Invention

The present invention relates to a head protecting airbag system that deploys an airbag downward along the side of a vehicle body in a passenger compartment when the vehicle is involved in either a side collision or a rollover. In particular, the present invention relates to a head protecting airbag system that deploys an inflation section between an occupant's head and the vehicle body.

2. Description of the Related Art

In the recent trends, a head protecting airbag system is mounted to vehicles as a supplemental restraint system. The head protection airbag system has a curtain airbag that is deployed downward from a roof side rail when the vehicle is involved in a side collision or rollover. As one of such head protecting airbag systems, there has been proposed a head protecting airbag system designed to deploy the airbag between the head of the occupant seated on the seat and the side of the vehicle body in order to protect the occupant's head.

This type of head protecting airbag system is described in Japanese Patent Application Publication No. 2004-58848 (JP-A-2004-58848). In this head protecting airbag system, the airbag includes a gas supply path and a main inflation part disposed on the lower side of the gas supply path. The airbag is folded with the main inflation part rolled up toward the outer side in the width direction of the vehicle and with the gas supply path not rolled, but folded for the sake of easier deployment of the airbag upon gas supply. In addition, Japanese Patent No. 3520836 describes a head protecting airbag system including a head protecting area and an extended inflation area. The extended inflation area has an inflation section of a thickness smaller than the thickness of a cell in the head protecting area. The head protecting airbag system is designed to deploy the extended inflation area from the bottom end of the head protecting area to a position below a door beltline of the vehicle.

However, the direction in which the airbag is deployed tends to be affected by the manner in which the airbag is folded. Therefore, in order to immediately deploy the airbag in the vehicle longitudinal direction along the side of the passenger compartment, the lower end of the airbag has to reliably deploy inward towards the passenger compartment to an area below a side window opening.

SUMMARY OF THE INVENTION

The present invention provides a head protecting airbag system having an airbag for deploying an inflation section of the airbag between an occupant's head and a side vehicle body, while preventing a bottom end of the airbag from protruding over a bottom edge of a side window opening.

A first aspect of the invention is directed to a head protecting airbag system. The head protecting airbag system has: an inflator that is activated upon at least one of a side collision and a rollover of the vehicle to inject gas; and an airbag that includes a gas supply path connected to the inflator, an inflation section that is connected to the gas supply path, that is constituted by plural cells, and that is located on the passenger compartment side of the side window opening to protect the head of an occupant in a deployed state, a horizontal cell that is provided in a vehicle longitudinal direction below the inflation section, and that is deployed to an area of the passenger compartment below the side window opening after the inflation section is deployed, wherein the airbag is folded up in a vehicle height direction and stored along a roof side rail section of the vehicle, and wherein the airbag is deployed downward along a side of a vehicle body in a passenger compartment when inflated by gas from the inflator.

When at least one of a side collision and a rollover occurs to the vehicle, the inflator is activated to supply gas into the airbag folded-up in the vehicle height direction and stored along the roof side rail section of the vehicle. This allows the airbag to be deployed downward along the side vehicle body in the passenger compartment. The airbag includes the gas supply path connected to the inflator and the inflation section connected to the gas supply path to protect an occupant's head. The occupant's head is thus protected by the inflation section.

According to the first aspect of the invention, the horizontal cell is provided in the vehicle longitudinal direction below the inflation section constituted by plural cells and deployed toward the passenger compartment with respect to the side window opening. The horizontal cell is deployed to an area of the passenger compartment below the side window opening after the inflation section is deployed. In other words, with the inflation section, designed to protect the head of the occupant, deploying downward along the side of the vehicle body in the passenger compartment, the horizontal cell deploys in the passenger compartment to an area below the side window opening. This prevents the horizontal cell from being deployed in the process of deploying the inflation section, and therefore, prevents the horizontal cell deployed from protruding over a bottom edge of the side window opening.

As described above, the invention allows the airbag to be deployed between the head of the occupant and the side of the vehicle body without protruding over the bottom edge of the side window opening in the process of deploying the airbag.

BRIEF DESCRIPTION OF THE DRAWINGS

The foregoing features and advantages of the invention will become apparent from the following description of example embodiments with reference to the accompanying drawings, wherein like numerals are used to represent like elements and wherein.

DETAILED DESCRIPTION OF THE EMBODIMENTS

A head protecting airbag system according to one embodiment of the invention will be described below with reference to FIGS. 1 to 5.

Figure 1:
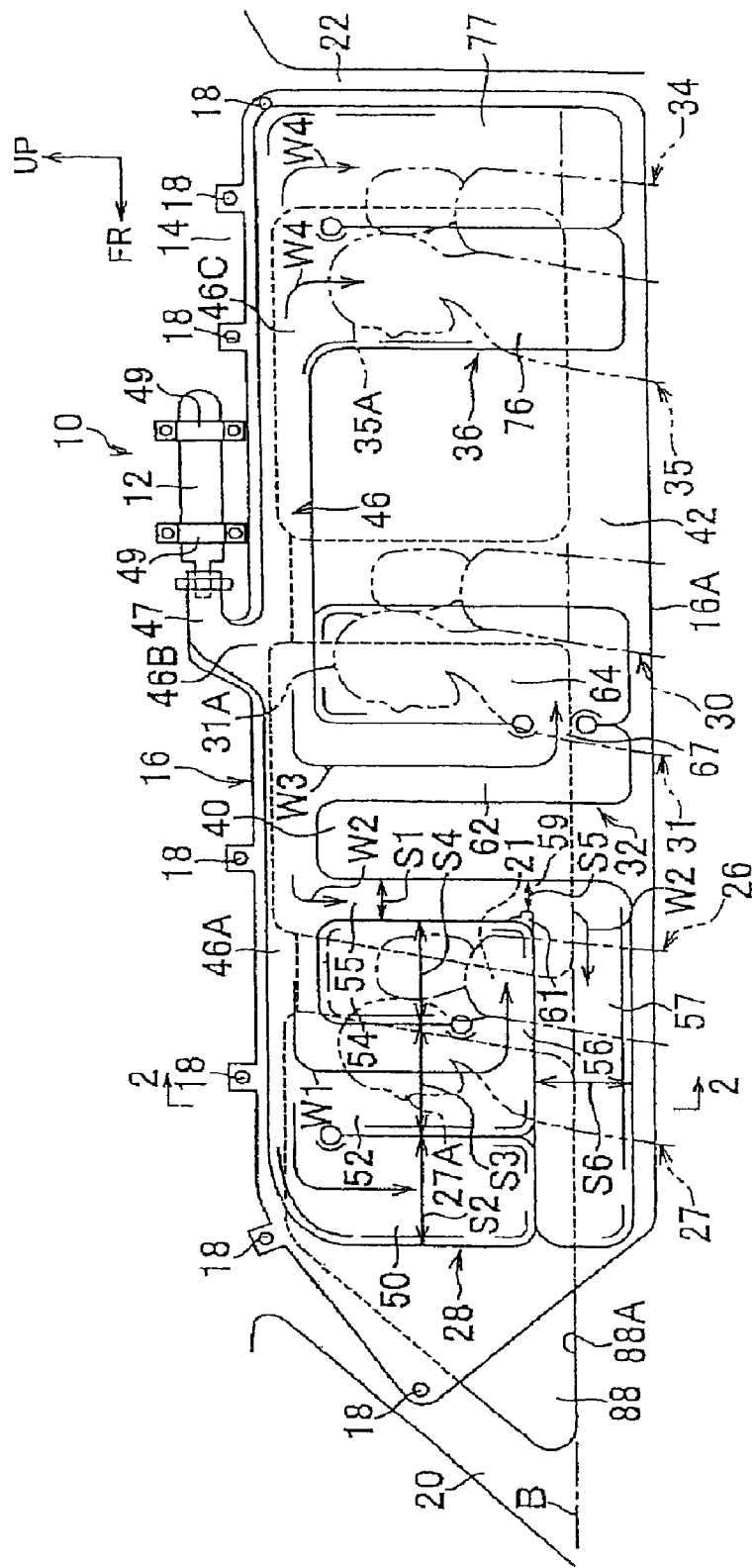
FIG. 1 is a side view of a head protecting airbag system according to one embodiment of the invention, in the deployed state.
Figure 2:
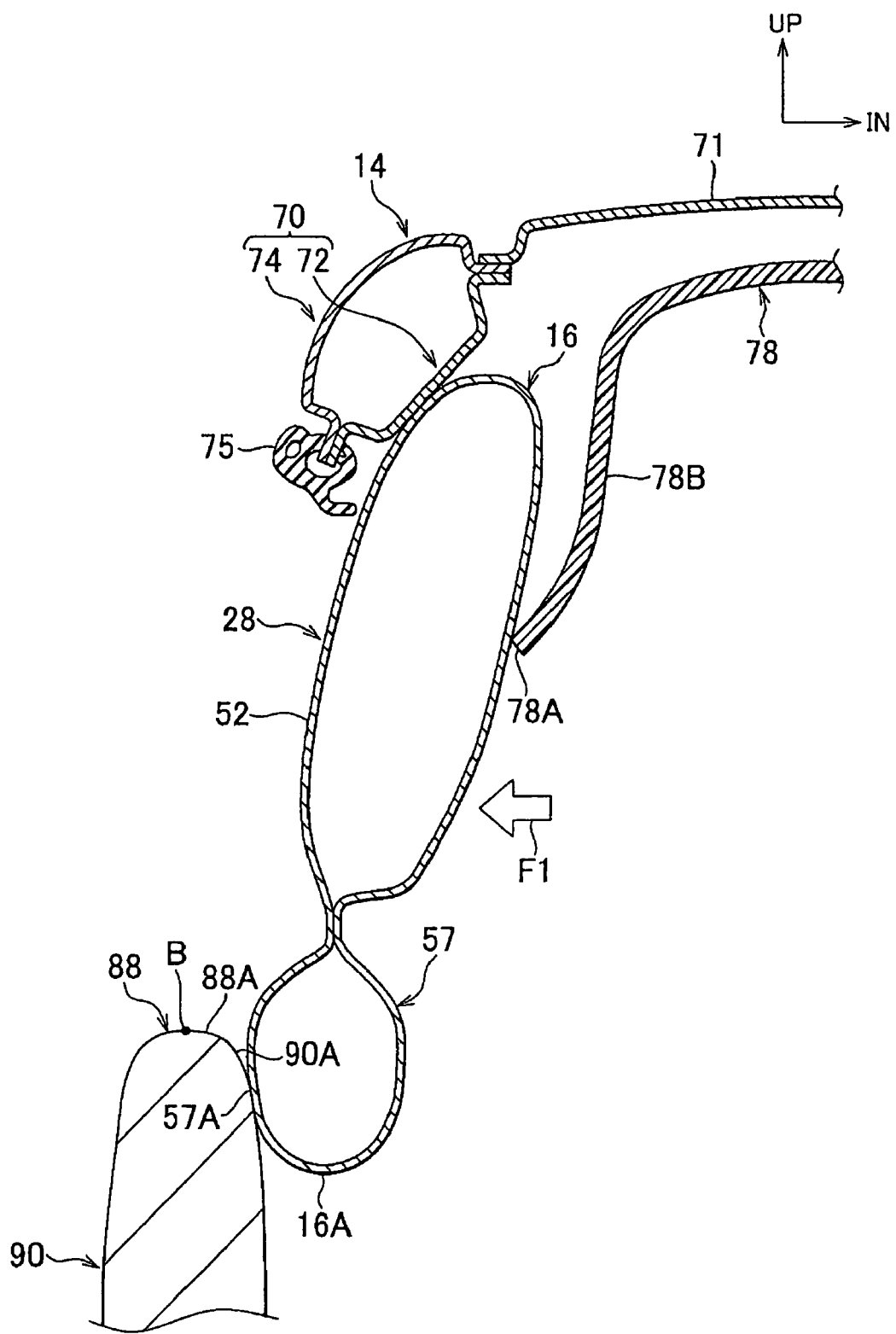
FIG. 2 is an enlarged sectional view taken along the line 2-2 in FIG. 1.
Figure 3:
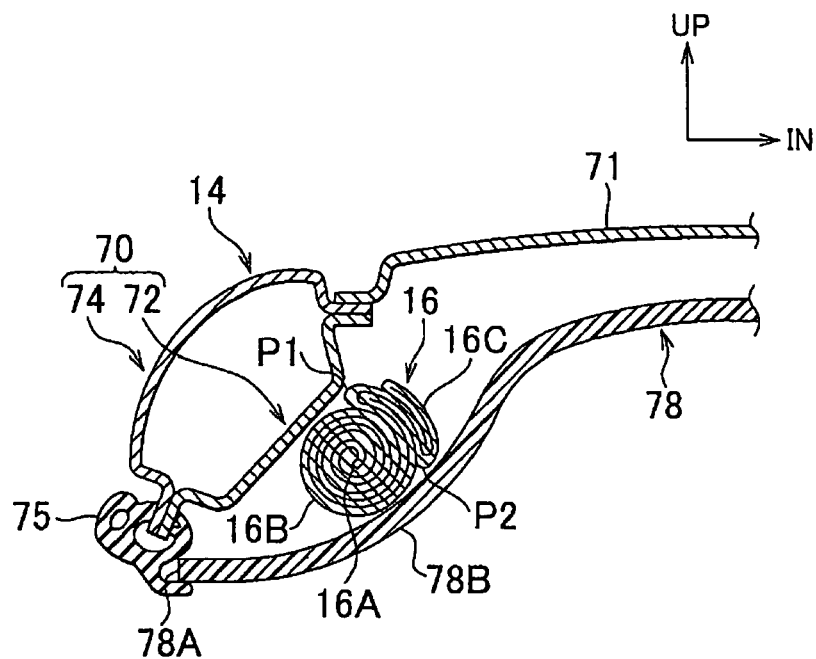
FIG. 3 is a sectional view corresponding to FIG. 2 and illustrating the stored airbag of the head protecting airbag system.
Figure 3:
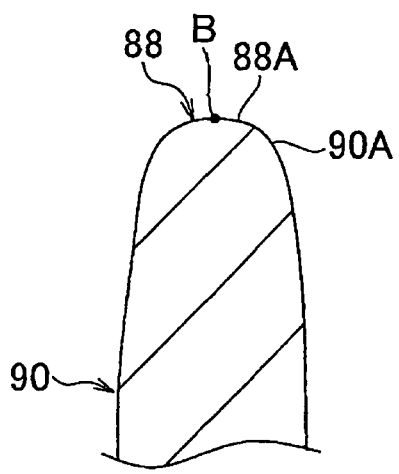

In FIGS. 1 to 3, the arrow FR and the arrow UP indicate forward direction and upward direction of the vehicle, respectively, while the arrow IN indicates inward direction with respect to the vehicle width.

FIG. 1 is a side view of a head protecting airbag system 10 according to the embodiment, in which the airbag 16 is deployed.

As shown in FIG. 1, the head protecting airbag system 10 includes a cylindrical inflator 12 and the airbag 16. The inflator 12 injects gas from its gas injecting portion when the inflator 12 is activated. The gas injecting portion of the inflator 12 connects to the airbag 16. The airbag 16 is folded in the vehicle height direction into a long rectangle that extends in the vehicle longitudinal direction, such that the folded airbag 16 is stored along a roof side rail section 14.

The inflator 12 is activated by an airbag controller (not shown) when the side collision sensor (not shown), which is located in position on the side vehicle body, detects a side collision or when the rollover sensor (not shown), which is located at around the center of the vehicle body, detects a rollover.

Attachment points 18 are provided at predetermined intervals along an upper outside edge of the airbag 16. The airbag 16 is supported at the attachment points 18 to body components, such as a front pillar 20 (A-pillar), the roof side rail section 14, and a D-pillar 22.

The airbag 16 includes: a forward inflation section 28 (front seat inflation section); a middle inflation section 32 (second-row seat inflation section); a rearward inflation section 36 (third-row seat inflation section); a first non-inflation section 40; a second non-inflation section 42; and an upper-end side inflation section 46. The forward inflation section 28 is designed to protect a head 27A of an occupant 27 seated on a front seat 26. The middle inflation section 32 is designed to protect a head 31A of an occupant 31 seated on a second-row seat 30. The rearward inflation section 36 is designed to protect a head 35A of an occupant 35 seated on a third-row seat 34. The first non-inflation section 40 has a flat rectangular shape extending in the vehicle height direction, and is located between the forward inflation section 28 and the middle inflation section 32. The second non-inflation section 42 has a flat rectangular shape, and is located between the middle inflation section 32 and the rearward inflation section 36. The upper-end side inflation section 46 as a gas supply path that extends along the upper portion of the airbag 16 in the vehicle longitudinal direction. The upper-end side inflation section 46 communicates with the forward inflation section 28, the middle inflation section 32, and the rearward inflation section 36 through their respective upper ends.

Further, a gas introducing section 47 is provided at a longitudinally middle portion of the upper-end side inflation section 46 in the airbag 16. The gas introducing section 47 is connected to the gas injecting portion of the inflator 12. The inflator 12 is fixed to the vehicle body with a pair of mounting brackets 49 with the gas injecting portion of the inflator 12 inserted into the gas introducing section 47. In other words, the head protecting airbag system 10 according to the first embodiment of the invention the inflator 12 is located at around the center portion of the upper edge side of the airbag 16 (centered inflator arrangement).

A bottom end 16A of the airbag 16 is located below a beltline B, which runs along a bottom edge 88A (top edge of a door panel) of a side window opening 88.

FIG. 2 is an enlarged sectional view taken along the line 2-2 in FIG. 1. FIG. 3 is a sectional view corresponding to FIG. 2 and illustrating the stored airbag.

As shown in FIG. 3, the roof side rail section 14 includes a roof side rail 70 or an outline frame member of the roof side rail section 14. The roof side rail 70 has a closed structure in section, including a roof side rail inner panel 72 and a roof side rail outer panel 74. The roof side rail inner panel 72 is positioned closer to the passenger compartment than the roof side rail outer panel 74. The roof side rail inner panel 72 and the roof side rail outer panel 74 have their respective lower flanges fitted into an opening trim 75.

The airbag 16 includes a bottom end part 16A, a rolled part 16B, and a folded part 16C. When the airbag 16 is deployed, the bottom end part 16A is located at the bottom end of the airbag 16. The rolled part 16B is formed by rolling-up a part of the airbag 16 from the bottom end part 16A toward the outer side of the passenger compartment. The folded part 16C is formed by folding-back the remaining part of the airbag 16 at a fold P1 on the outer side and a fold P2 on the inner side with respect to the vehicle width.

The folded airbag 16 is fastened to the roof side rail inner panel 72 by means of a fastening member (not shown), such as a bolt. A roof head lining 78 includes an edge part 78A and a terminal part 78B. The edge part 78A engages the opening trim 75. The terminal part 78B covers the folded airbag 16.

As shown in FIG. 3, the roof side rail outer panel 74 connects to the roof panel 71 by means of welding.

As shown in FIG. 1, the forward inflation section 28 is constituted by three cylindrical cells 50, 52, 54 arranged next to each other in the vehicle longitudinal direction. The cylindrical cells 50, 52, 54 extend in the vehicle height direction. A vertical cell 55 is placed adjacent to the cell 54 rearward in the longitudinal direction of the vehicle. The vertical cell 55 extends in the vehicle height direction at the rear of the B-pillar 21.

The cell refers to an inflated portion that is inflated by gas supplied from the inflator, but does not include a non-inflation section that forms an outer periphery of the inflated portion.

The two cells 50 and 52 on the forward side in the forward inflation section 28 have respective upper end openings. These openings communicate with a front part 46A of the upper-end side inflation section 46. The front part 46A of the upper-end side inflation section 46 is provided forward relative to a communicating part 46B where the upper-end side inflation section 46 communicates with the inflator 12. A forward lower end of the cell 54 communicates with a rearward lower end of the cell 52 through a communicating part 56.

Thus, part of gas injected from the inflator 12 flows downward, through the upper-end side inflation section 46, into the cells 50 and 52 along the path shown by the arrow W1 in FIG. 1, and then into the cell 54 from a lower end of the cell 52 through the communicating part 56. This causes the cell 54 to be deployed with a time lag behind the deployment of the cells 50, 52, and a vertical cell 55 to be discussed later. In other words, the cell 54, which corresponds to the B-pillar 21, deploys downward with its thickness remaining small. Therefore, the cell 54 deploys smoothly in a small gap between the B-pillar 21 and the head 27A of the occupant 27.

A vertical cell 55 has an upper opening end connecting to the front part 46A of the upper-end side inflation section 46. When viewed in the vehicle height direction, a sectional area S1 of the vertical cell 55 in the deployed state is smaller than sectional areas S2 and S3 of the respective cells 50 and 52 in the deployed state. The cells 50, 52, 54 form the inflation section 28 designed to protect the head 27A of the occupant 27, while the cell 54 deploys on the inner side of the B-pillar 21 in the passenger compartment.

In the embodiment of the invention, in order to help the cell 54 deploy between the B-pillar 21 and the head 27A of the occupant 27, a sectional area S4 of the cell 54 in the deployed state is smaller than the sectional areas S2 and S3 of the respective cells 50 and 52 in the deployed state, when viewed in the vehicle height direction. Alternatively, the sectional area S4 of the cell 54 in the deployed state may be equal to or larger than the sectional areas S2 and S3 of the respective cells 50 and 52 in the deployed state, if the B-pillar 21 has a smaller thickness in the vehicle width direction to help the cell 54 deploy between the B-pillar 21 and the head 27A of the occupant 27.

A bottom end of the vertical cell 55 communicates with a rear top end of a horizontal cell 57. The longitudinal direction of the horizontal cell 57 is oriented in the vehicle longitudinal direction. An orifice 59 is formed as gas flow rate restricting means at a communicating portion between the vertical cell 55 and the horizontal cell 57. To be more specific, a non-inflation part 61 is formed in front of the orifice 59, and a sectional area S5 of the orifice 59 in the deployed state is smaller than the sectional area S1 of the vertical cell 55 in the deployed state, when viewed in the vehicle height direction. The orifice 59 restricts the flow rate of gas flowing from the vertical cell 55 through the sectional area S5 to the horizontal cell 57.

A sectional area S6 of the horizontal cell 57 in the deployed state, when viewed in the vehicle longitudinal direction, is larger than the sectional area S5 of the orifice 59 and the sectional area S1 of the vertical cell 55 in the deployed state when viewed in the vehicle height direction. As shown in FIG. 1, bottom ends of the cells 50, 52, 54 of the forward inflation section 28 are located above the bottom edge of the side window opening 88. The horizontal cell 57 is nearly as long as the forward inflation section 28 in the vehicle longitudinal direction. The orifice 59 is provided in a communicating part between the vertical cell 55 and the horizontal cell 57. More specifically, the orifice 59 is provided in the vertical cell 55 in place to approximately correspond with a bottom end of the forward inflation section 28. In addition, the vertical cell 55 is provided rearward relative to the cells 50, 52, 54.

As shown in FIG. 2, when the airbag 16 is deployed, a lower part 57A of the horizontal cell 57 deploys to an area below the bottom edge 88A of the side window opening 88 that is the beltline B in the passenger compartment on the inner side of an upper part 90A of a front side door 90.

Thus, as shown in FIG. 1, gas injected from the inflator 12 flows along the path shown by the arrow W2 in FIG. 1 through the upper-end side inflation section 46, downward into the vertical cell 55, and then into the horizontal cell 57 through the orifice 59.

Figure 4:
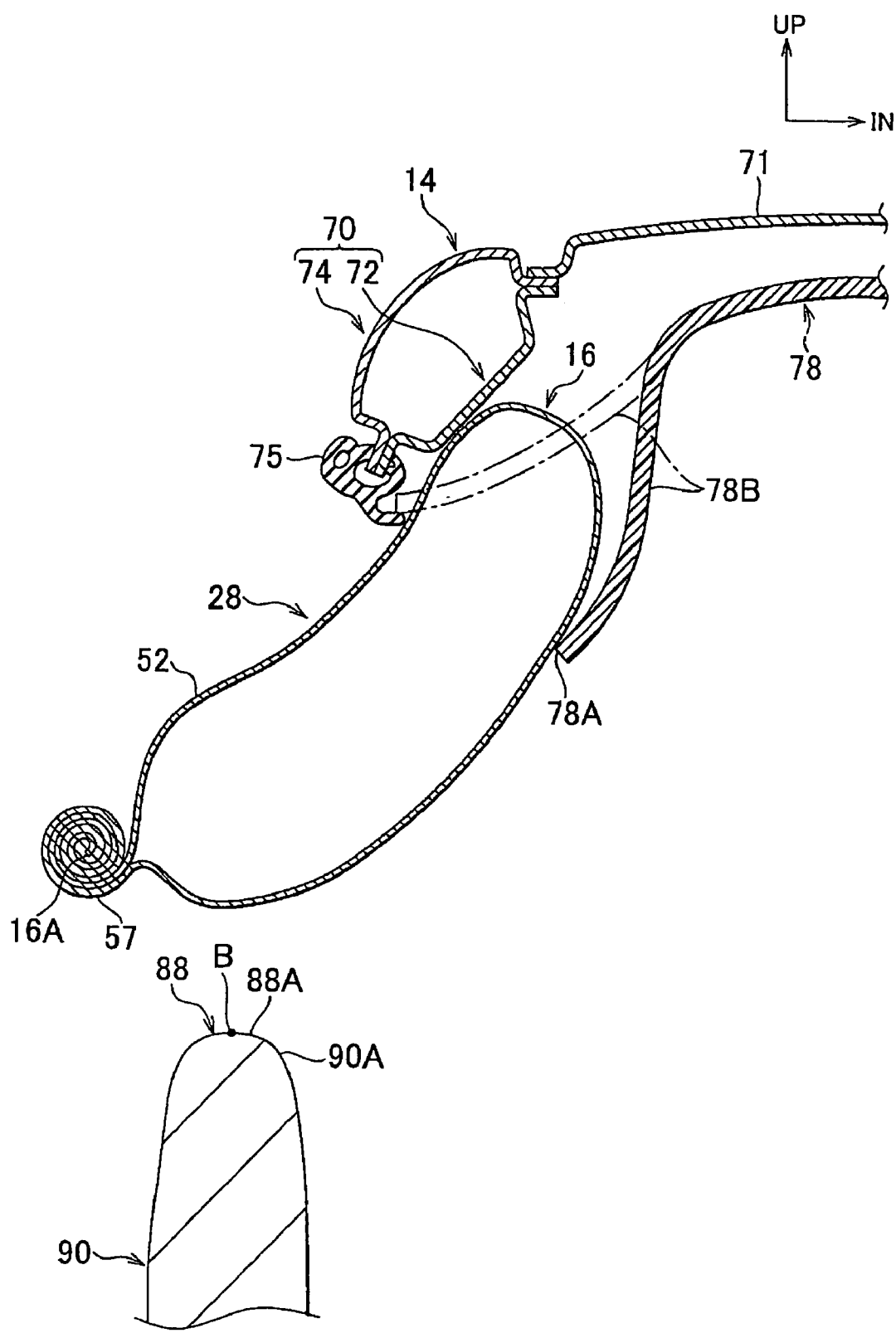
FIG. 4 is a sectional view corresponding to FIG. 2 and illustrating the airbag of the head protecting airbag system in the process being deployed.
Figure 5:
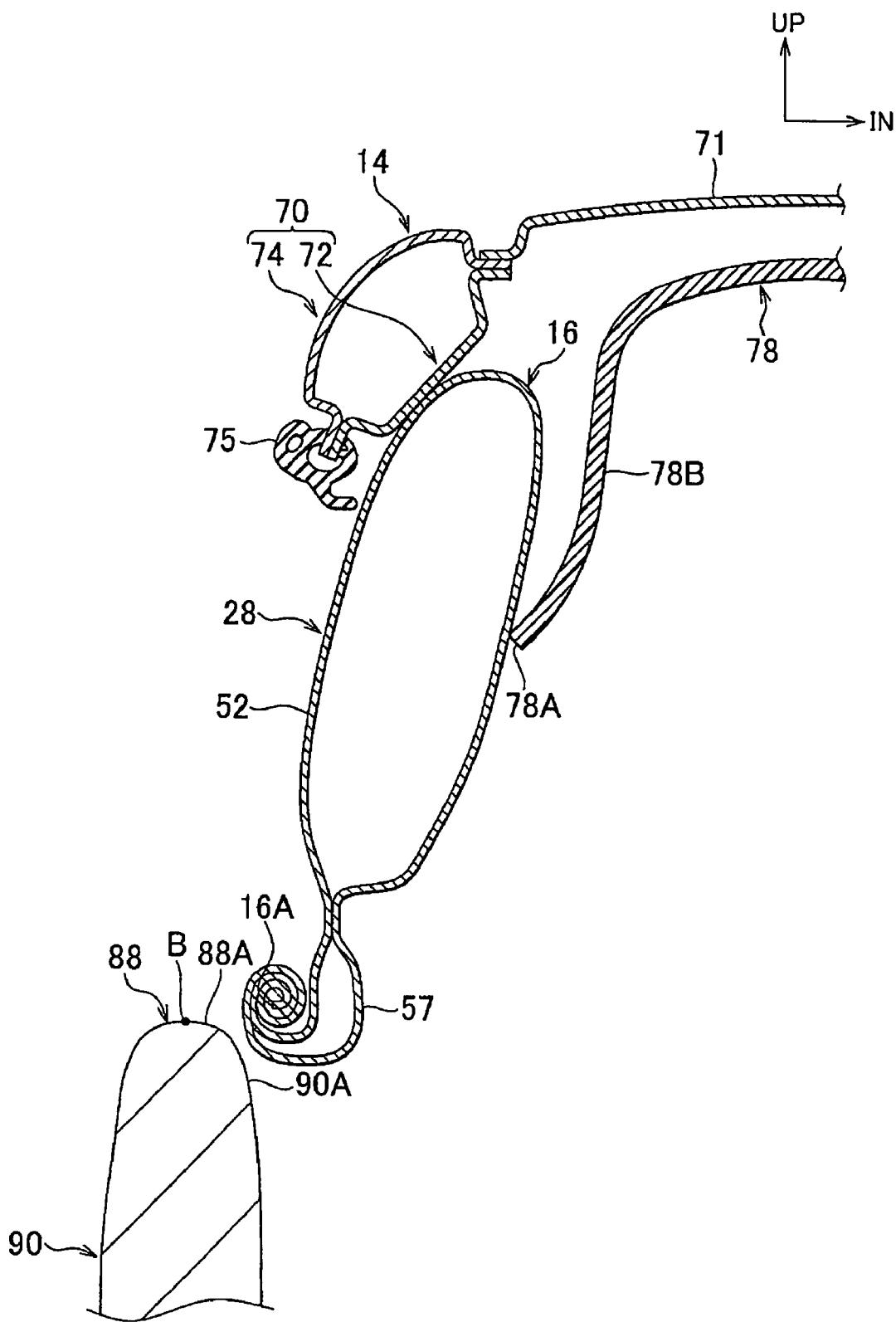
FIG. 5 is a sectional view corresponding to FIG. 2 and illustrating the airbag of the head protecting airbag system in the process being deployed.

FIGS. 4 and 5 are sectional views corresponding to FIG. 2 and illustrating the airbag in the process of its deployment.

Deployment of the airbag 16 is affected depending on different folded states of the airbag 16. As shown in FIG. 4, in the process of deploying the cells 50, 52, 55, the folded horizontal cell 57 or the lower side part of the airbag 16 may protrude through the side window opening 88 if the side window glass is opened.

In this case, as shown in FIG. 5 where the cells 50, 52, 55 (except the cell 54) are deployed completely, the overall length of the airbag 16 becomes smaller as a result of the deployment of the cells 50, 52, 55 (62, 76, 77 as shown in FIG. 1). Therefore, the folded horizontal cell 57 or the lower side part of the airbag 16 is pulled back toward the passenger compartment with respect to the side window opening 88 due to tension which is applied to the airbag 16 in the vehicle longitudinal direction.

In the embodiment of the invention, in order to help the cell 54 deploy smoothly between the B-pillar 21 and the head 27A of the occupant 27, the cell 54 is deployed with a time lag behind the deployment of the cells 50, 52, 55. Alternatively, the cell 54 may be deployed simultaneously with the cells 50, 52, 55, if the B-pillar 21 has a smaller thickness in the vehicle width direction to help the cell 54 deploy between the B-pillar 21 and the head 27A of the occupant 27.

When the folded horizontal cell 57, that is the lower side part of the airbag 16, is pulled back toward the passenger compartment with respect to the side window opening 88, gas flows into the horizontal cell 57 through the orifice 59 and inflates the horizontal cell 57.

Therefore, in the embodiment of the invention, the horizontal cell 57 is prevented from protruding over the bottom edge 88A (beltline B) of the side window opening 88 in the process of its deployment.

When the horizontal cell 57 is completely deployed as shown in FIG. 2, the cells 50 and 52 of the inflation section 28 of the airbag 16 contact the head 27A of the occupant 27 seated on the front seat 26 shown in FIG. 1. At this moment, a load outward of the passenger compartment (shown in the arrow F1 of FIG. 2) is applied to these cells 50 and 52. In this case, the horizontal cell 57 contacts the upper part 90A of the front side door 90, so that the airbag 16 is prevented from moving through the side window opening 88. This effectively restrains the occupant 27 in the passenger compartment.

As shown in FIG. 1, the middle inflation section 32 is constituted by two cylindrical cells 62 and 64 arranged next to each other in the vehicle longitudinal direction. The cylindrical cells 62 and 64 extend approximately in the vehicle height direction. The forward cell 62 has an upper end opening communicating with a longitudinal middle portion of the upper-end side inflation section 46. A rearward lower part of the cell 62 communicates with a forward lower part of the rearward cell 64 through a communicating part 67. An area above the rearward cell 64 forms the communicating part 46B where the upper-end side inflation section 46 connects to the inflator 12.

Thus, part of gas injected from the inflator 12 (shown by the arrow W3 in FIG. 1) flows through the upper-end side inflation section 46 downward into the forward cell 62, and then into the cell 64 through the communicating part 67 that communicates the rearward lower part of the cell 62 with the forward lower part of the cell 64.

The rearward inflation section 36 is constituted by two cylindrical cells 76 and 77 arranged next to each other in the vehicle longitudinal direction. The cylindrical cells 76 and 77 extend approximately in the vehicle height direction. The two cells 76 and 77 have respective upper end openings connecting to a rear part 46C of the upper-end side inflation section 46. The rear part 46C of the upper-end side inflation section 46 is located rearward relative to the connecting part 46B where the upper-end side inflation section 46 connects to the inflator 12.

Thus, part of gas injected from the inflator 12 (shown by the arrow W4 in FIG. 1) flows through the upper-end side inflation section 46 downward into the two cells 76 and 77. As shown in FIG. 1, the bottom ends of the cells 62, 64 of the middle inflation section 32 and the bottom ends of the cells 76, 77 of the rearward inflation section 36 are respectively located below the bottom edge of the side window opening 88.

Now, functions and effects of the first embodiment are described.

When a side collision or rollover occurs to the vehicle, the side collision sensor or the rollover sensor detects a side collision or rollover, and outputs the condition to the airbag controller. If the airbag controller determines that a side collision or rollover has occurred, the inflator 12 is activated to supply gas into the folded airbag 16 that is stored along the roof side rail section 14 of the vehicle.

Specifically, gas is supplied through the gas introducing part 47 of the airbag 16 to inflate the upper-end side inflation section 46, the forward inflation section 28, the middle inflation section 32, and the rearward inflation section 36, such that the airbag 16 is deployed downward in a curtain shape along the side vehicle body in the passenger compartment. This allows the forward inflation section 28 to protect the head 27A of the occupant 27 seated on the front seat 26, while allowing the middle inflation section 32 and the rearward inflation section 36 to protect the head 31A of the occupant 31 seated on the second-row seat 30 and the head 35A of the occupant 35 seated on the third-row seat 34, respectively.

In the head protecting airbag system 10 according to the embodiment of the invention, the vertical cell 55 is formed rearward of the B-pillar 21. The vertical cell 55 extends in the vehicle height direction, while communicating through its bottom end with the horizontal cell 57. The longitudinal direction of the horizontal cell 57 is oriented in the vehicle longitudinal direction. The sectional area S5 of the orifice 59 in the deployed state, which is formed in the communicating part between the vertical cell 55 and the horizontal cell 57, is smaller than the sectional area S1 of the vertical cell 55 in the deployed state, when viewed in the vehicle height direction. In addition, the sectional area S6 of the horizontal cell 57 in the deployed state, when viewed in the vehicle longitudinal direction, is larger than the sectional area S5 of the orifice 59 in the deployed state when viewed in the vehicle height direction.

Deployment of the airbag 16 is affected depending on different folded states of the airbag 16. Thus, as shown in FIG. 4, the folded horizontal cell 57 or the lower side part of the airbag 16 protrudes through the side window opening 88 in the airbag 16 deployment process. In this case, as shown in FIG. 5 where the cells 50, 52, 55 (except the cell 54) are deployed completely, the folded horizontal cell 57 that is the lower side part of the airbag 16 is pulled back toward the passenger compartment with respect to the side window opening 88 due to tension. The tension is generated upon the deployment of the cells 50, 52, 55 and acts on the airbag 16 in the vehicle longitudinal direction.

As shown in FIG. 5, when the folded horizontal cell 57 or the lower side part of the airbag 16 is pulled back toward the passenger compartment with respect to the side window opening 88, gas flows into the horizontal cell 57 through the orifice 59 to deploy the horizontal cell 57. Therefore, the horizontal cell 57 is prevented from protruding over the bottom edge 88A (beltline B) of the side window opening 88 in the process of its deployment.

As described above, in the embodiment of the invention, the bottom end 16A of the airbag 16 is prevented from protruding over the bottom edge 88A (beltline B) of the side window opening 88 in the process of deploying the airbag 16. This allows the forward inflation section 28 of the airbag 16 to be deployed between the head 27A of the occupant 27 and the side of the vehicle body (B-pillar 21 or the closed side window glass).

Further, in the embodiment of the invention, when the horizontal cell 57 is completely deployed as shown in FIG. 2, the cells 50 and 52 of the inflation section 28 of the airbag 16 contacts the head 27A of the occupant 27 seated on the front seat 26 shown in FIG. 1. At this moment, a load outward from the passenger compartment (shown in the arrow F1 of FIG. 2) is applied to the cells 50 and 52. In this case, the horizontal cell 57 contacts the upper part 90A of the front side door 90, so that the airbag 16 is prevented from moving outward from the passenger compartment through the side window opening 88. This effectively retains the occupant 27 in the passenger compartment.

Although the detailed descriptions of example embodiments of the invention have been provided, the present invention is not limited to the described embodiments, but various other embodiments may also be allowed without departing the scope of the invention. For example, in the aforementioned embodiment, the orifice 59 restricts the flow rate of gas flowing from the vertical cell 55 to the horizontal cell 57. However, in place of the orifice 59, other gas flow rate restricting means may be used, such as a furcated member, to restrict the flow rate of gas flowing from the vertical cell 55 to the horizontal cell 57.

In addition, the vertical cell 55 extends in the vehicle height direction rearward of the B-pillar 21, and communicates through its bottom end with the horizontal cell 57. However, the invention is not limited to that. Alternatively, either one of the cells 50, 52, 54 may communicate through its bottom end with the horizontal cell 57. In such a case, the communicating part is provided with a orifice in order to deploy the horizontal cell 57 with a time lag behind the deployment of the cell 50, 52 or 54. Further, two or more of the cells 50, 52, 54, 55 may communicate with the horizontal cell 57.

Still further, the invention is applied to the forward inflation section 28 of the airbag 16 to protect the head 27A of the occupant 27 seated on the front seat 26. However, the invention is not limited to that. Alternatively, the invention may be applied to the middle inflation section 32 to protect the head 31A of the occupant 31 seated on the second-row seat 30, or the rearward inflation section 36 to protect the head 35A of the occupant 35 seated on the third-row seat 34.

Although the invention is applied to the vehicle with three-row seating including the front seat 26, the second-row seat 30, and the third-row seat 34, the invention is not limited to that. Alternatively, the invention may be applied to vehicles with two-row seating or other seating arrangements.

Further, the gas injecting portion of the inflator 12 is directly inserted into the gas introducing section 47 of the airbag 16 to fix the inflator 12 to the gas introducing section 47. However, the invention is not limited to that. Alternatively, a diffuser (pipe) or other member may be used to connect the gas introducing section 47 and the inflator 12. Still further, the inflator 12 is located at around the longitudinal middle of the upper edge side of the airbag 16 (centered inflator arrangement). Alternatively, other arrangements may be employed, in which the inflator 12 is provided at the location of the garnish of the D-pillar 22.

Still further, one inflator 12 is used to inject gas into the airbag 16. However, the invention is not limited to that. Alternatively, two or more inflators 12 may be used to inject gas into the airbag 16.

Still further, the airbag 16 has a one-piece structure. However, the invention is not limited to that. Alternatively, the airbag 16 may have a two-piece structure that includes a forward part and a rearward part in the vehicle longitudinal direction.

Still further, the number of cells to respectively form the forward inflation section 28, the middle inflation section 32, and the rearward inflation section 36, as well as the shapes and locations of the cells are not limited to those shown in FIG. 1.

What is claimed is:

1. A head protecting airbag system comprising:
   an inflator that is activated, upon at least one of a side collision and a rollover of a vehicle, to inject gas;

an airbag that includes:
  a gas supply path connected to the inflator;
  an inflation section that is constituted by a first cell that includes a first top opening which is communicably connected with the gas supply path, a second cell that includes a second top opening which is communicably connected with the gas supply path, and a third cell that includes a communicating part that introduces gas into the third cell from only the second cell, the inflation section being connected to the gas supply path and being located on a passenger compartment side of a side window opening to protect the head of an occupant in a deployed state;
  a vertical cell that extends in the vehicle height direction and is provided at the rear of a pillar of the vehicle, the vertical cell extending in the vehicle height direction, an upper end of the vertical cell being communicably connected to only the gas supply path, a sectional area of the vertical cell in the deployed state being smaller than each sectional area of the first cell, the second cell and the third cell, when viewed in the vehicle height direction;
  a horizontal cell that is provided in a vehicle longitudinal direction below the inflation section, and that is deployed to an area of the passenger compartment below the side window opening after the inflation section is deployed, the horizontal cell being communicably connected with the vertical cell through a bottom end of the vertical cell,
wherein the airbag is folded up in a vehicle height direction and stored along a roof side rail section of the vehicle, and is deployed downward along a side of a vehicle body in a passenger compartment when inflated by gas from the inflator.

2. The head protecting airbag system according to claim 1, wherein the airbag has a gas flow rate restricting portion, provided in a communicating part between the vertical cell and the horizontal cell, that restricts a flow rate of gas flowing into the horizontal cell.

3. The head protecting airbag system according to claim 2, wherein:
  the gas flow rate restricting portion is an orifice; and
  a sectional area of the orifice is smaller than the sectional area of the vertical cell in the deployed state, when viewed in the vehicle height direction, and smaller than a sectional area of the horizontal cell in the deployed state, when viewed in the vehicle longitudinal direction.

4. The head protecting airbag system according to claim 2, wherein the gas flow rate restricting portion is provided in the vertical cell at a position corresponding to the bottom end of the inflation section.

5. The head protecting airbag system according to claim 1, wherein the first cell, the second cell, and the third cell are arranged next to each other in the vehicle longitudinal direction;
  the second cell is provided between the first cell and the third cell; and
  the communicating part is provided at a lower end of the third cell.

6. The head protecting airbag system according to claim 5, wherein the third cell is provided at a location to overlap with the pillar in a side view.

7. The head protecting airbag system according to claim 6, wherein the vertical cell is provided on a rear side of the third cell in the vehicle longitudinal direction.

8. The head protecting airbag system according to claim 5, wherein the sectional area of the vertical cell in the deployed state, when viewed in the vehicle height direction, is smaller than each sectional area of the first cell and the second cell in the deployed state, when viewed in the vehicle height direction.

9. The head protecting airbag system according to claim 5, wherein the horizontal cell is provided in contact with bottom ends of the first cell, the second cell, and the third cell.

10. The head protecting airbag system according to claim 1, wherein the inflation section further includes a gas introducing portion that communicably connects the horizontal cell with a bottom end of at least one of the vertical cell, through which gas from the vertical cell is introduced into the horizontal cell, and that restricts the flow rate of gas.

11. The head protecting airbag system according to claim 1, wherein a bottom end of the inflation section in the deployed state is located above a bottom edge of the side window opening.

12. The head protecting airbag system according to claim 1, wherein the length of the horizontal cell is approximately equal to the length of the inflation section in the vehicle longitudinal direction.

13. The head protecting airbag system according to claim 1, wherein the vertical cell is provided rearward relative to the inflation section in the longitudinal direction of the vehicle.

14. The head protecting airbag system according to claim 1, wherein a sectional area of the horizontal cell in the deployed state, when viewed in the vehicle longitudinal direction, is larger than the sectional area of the vertical cell in the deployed state, when viewed in the vehicle height direction.

15. The head protecting airbag system according to claim 1, wherein:
  the airbag comprises a forward inflation portion that protects a head of an occupant seated on a front seat of the vehicle, and a rearward inflation portion that protects a head of an occupant seated rearward of the occupant seated on the front seat in the longitudinal direction of the vehicle; and
  the inflation section, the vertical cell and the horizontal cell are provided on the forward inflation portion.

16. The head protecting airbag system according to claim 15, wherein:
  the rearward inflation portion is constituted by plural cells extending in the vehicle height direction; and
  bottom ends of the plural cells of the rearward inflation portion are located below the bottom edge of the side window opening.

17. The head protecting airbag system according to claim 16, wherein the rearward inflation portion includes an inflation portion for a second-row seat and an inflation portion for a third-row seat.

18. The head protecting airbag system according to claim 1, wherein the third cell is deployed with a time lag behind the deployment of the first cell and the second cell.

19. The head protecting airbag system according to claim 1, wherein the third cell has an upper end that is closed so as not to communicate with the gas supply path.

20. The head protecting airbag system according to claim 1, wherein the third cell is located next to the pillar in a width direction of the vehicle upon deployment of the airbag.

* * * * *